United States Patent Office 3,318,106
Patented May 9, 1967

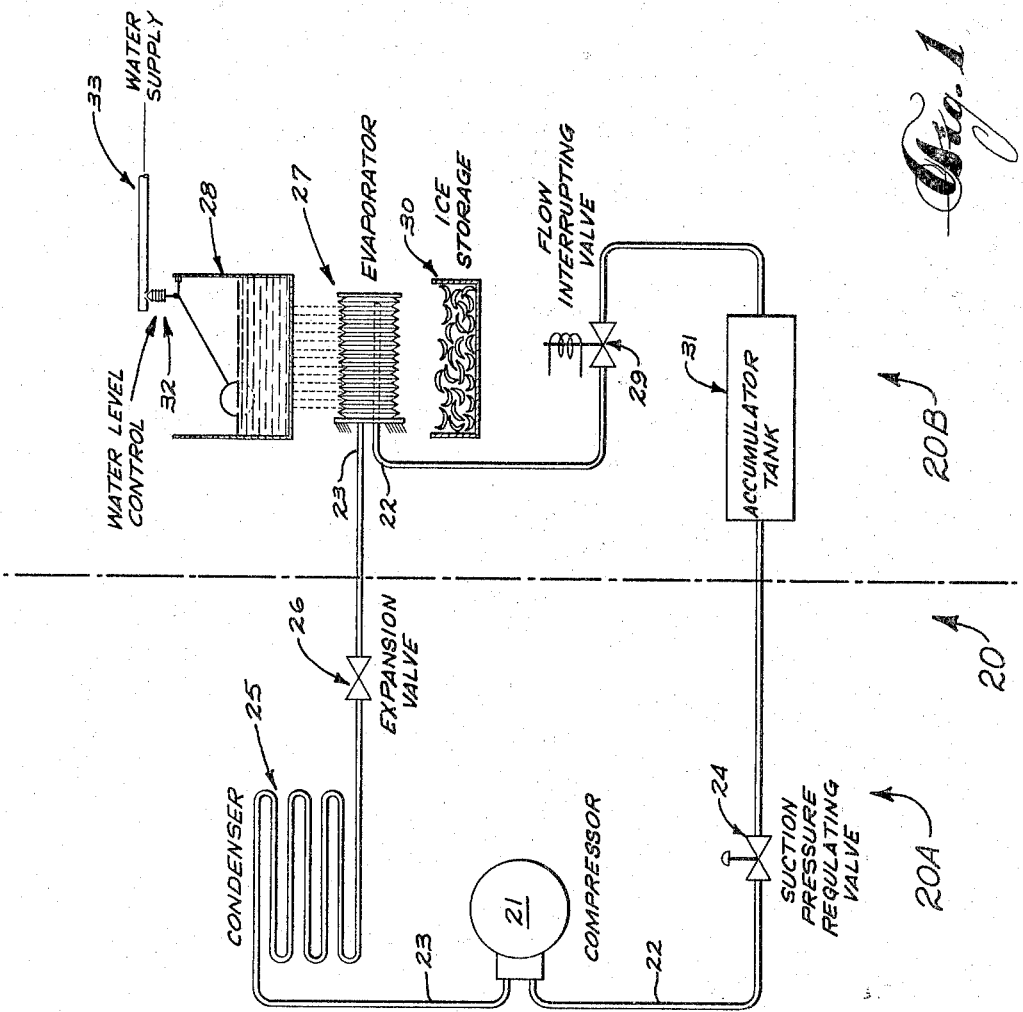

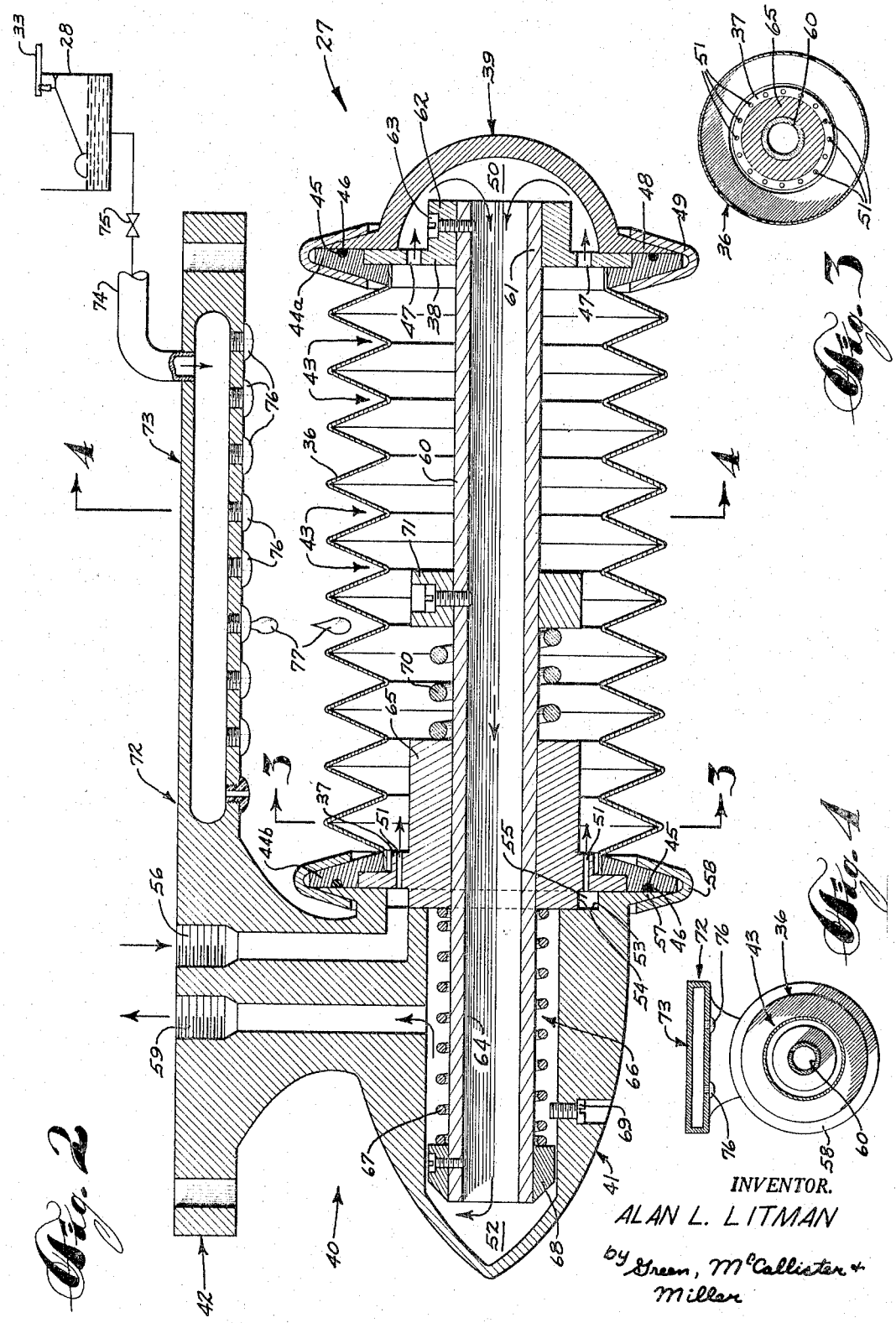

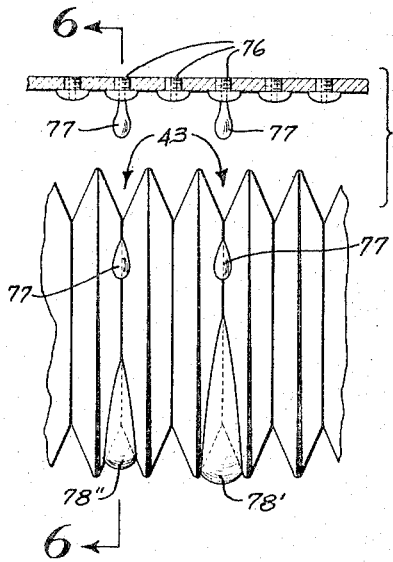
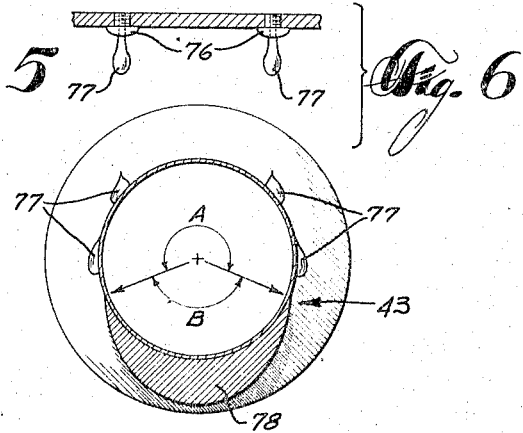
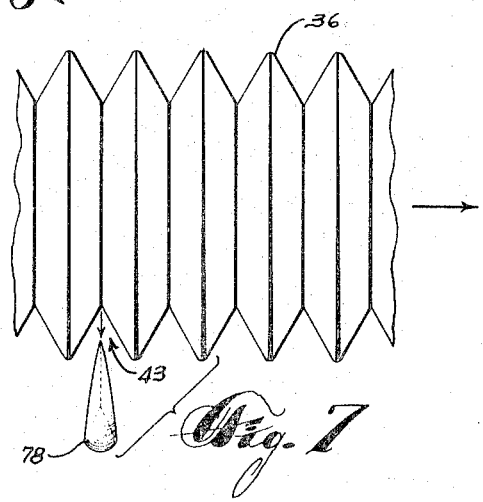
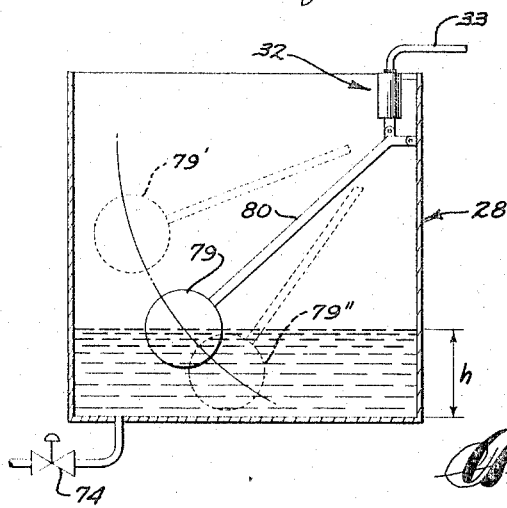
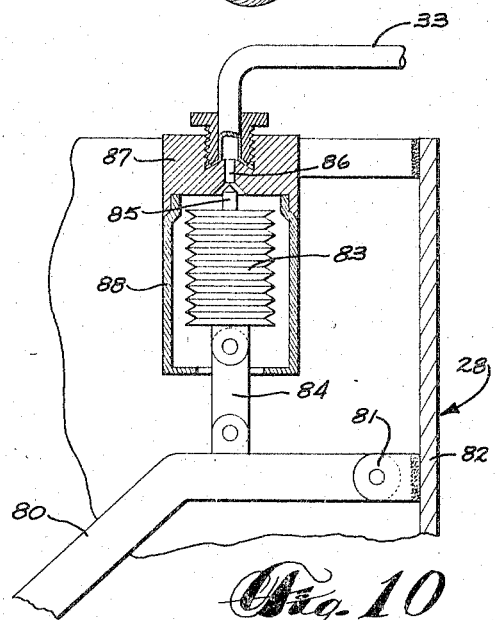
INVENTOR.
ALAN L. LITMAN

3,318,106
BELLOWS TYPE LIQUID SOLIDIFYING
APPARATUS
Alan L. Litman, 114 Hartwood Drive,
Pittsburgh, Pa. 15208
Filed Oct. 29, 1965, Ser. No. 518,497
11 Claims. (Cl. 62—189)

This invention relates to a liquid solidifying apparatus. More particularly this invention relates to making and harvesting ice, in the form of crescents, from a totally-enclosed bellows.

Totally-enclosed bellows used for the formation of ice are shown in the art. Particularly U.S. Patents 1,878,759 to Copeman and 2,582,250 to Hershberg et al. describe vertically positioned totally-enclosed bellows for solidifying a liquid on their interior surface. In turn these bellows are mechanically extended so that the solidified deposit formed thereon is automatically disengaged. In both of these structures, a refrigerating means is provided in heat transferring relation with the exterior surface of the bellows.

According to the present invention, a totally-enclosed bellows is provided having an inlet conduit means and a suction conduit means both communicating with the interior of the bellows. The inlet conduit means introduces a spray of refrigerant into the interior of the bellows. The suction conduit means exhausts evaporated refrigerant from the interior of the bellows.

The present bellows has a generally cylindrical configuration with a distortable wall, exposed to the atmosphere. The corrugations define a plurality of troughs. Means is provided for depositing droplets of the liquid to be solidified, as for example water, into the troughs in liquid-chilling relation with the exterior surface of the bellows. The droplets are prechilled as they flow around the troughs whereby a major portion of the droplets are solidified in the form of crescents along the lowermost portion of each trough.

Thus, the broadest aspect of the present invention is to provide a refrigerating circuit wherein the present totally-enclosed bellows serves directly as the evaporator. That is to say, a spray of liquid refrigerant is introduced into the bellows which is evaporated by the heat transferred from the liquid on the exterior surface of the bellows. The evaporated refrigerant is exhausted from the interior of the bellows and recirculated in the refrigerant circuit.

In order to harvest the solidified deposit formed in the troughs of the bellows, a novel cyclically operated means is provided for periodically extending the distortable wall in the direction of its length. This distortion automatically disengages the solidified deposit from the exterior surface of the bellows. It should be noted that the size of the deposit may be adjusted by changing the length of time elapsed between distortions of the bellows.

Further, a return means is provided for contracting the distortable wall into its normally relaxed condition.

Still further, a regulating means is provided, responsive to the temperature of the liquid to be solidified, which controls the rate at which the droplets are deposited on the bellows. Hence the amount of liquid solidified is varied according to the temperature of the liquid.

With these remarks in mind, the principal objects of this invention include:

To provide an ice making apparatus which will continuously and unattendedly manufacture ice in the form of crescents;

To provide an ice making apparatus having a totally-enclosed bellows which is used directly as the evaporator of the refrigeration circuit;

To provide an ice making apparatus having a horizontally positioned, totally-enclosed bellows upon which the ice crescents are formed;

To provide an ice making apparatus wherein the size of the ice crescents can be controlled;

To provide an ice making apparatus that will automatically disengage the ice crescents at predetermined time intervals by extending the bellows in the direction of its length;

To provide an ice making apparatus wherein the flow rate of the water, supplied to the bellows, is dependent on the temperature of the water;

To provide novel regulating means, responsive to the temperature of the water, for controlling the flow rate of the water to the bellows; and To provide a novel totally-enclosed bellows which may be used singly to manufacture ice crescents or which may be staged with other units of the totally-enclosed bellows to increase the ice making capacity thereof.

These and other objects and advantages of the present invention will become apparent from the following detailed description by reference to the accompanying drawings in which:

FIGURE 1 is a schematic diagram illustrating the refrigeration circuit of the present invention;

FIGURE 2 is a cross-sectional view illustrating the preferred embodiment of tthe ice making apparatus of the present invention;

FIGURE 3 is a cross-sectional view, taken along the line 3—3 of FIGURE 2, illustrating refrigerant inlet openings in a fixed end wall of the present ice making apparatus;

FIGURE 4 is a cross-sectional view, taken along the line 4—4 of FIGURE 2, further illustrating the present ice making apparatus;

FIGURE 5 is a fragmentary elevation view illustrating a distortable wall of the present invention;

FIGURE 6 is a cross-sectional view, taken along the line 6—6 of FIGURE 5, illustrating the prechilling and ice forming areas of the distortable wall of FIGURE 5;

FIGURE 7 is a fragmentary elevation view illustrating the disengagement of the ice formed on the distortable wall of FIGURE 5;

FIGURE 8 is an isometric view illustrating a typical ice crescent formed on the present ice making apparatus;

FIGURE 9 is a cross-sectional view illustrating a water supply tank and water level control means; and FIGURE 10 is a cross-sectional view illustrating a water temperature responsive regulating means employed in the water supply tank of FIGURE 8.

The present invention will now be generally described by reference to FIGURE 1 wherein there is illustrated a schematic diagram of a refrigeration circuit 20. The refrigeration circuit 20 is divided into two segments (by the dash-dot line) designated by 20A and 20B.

The segment 20A comprises that portion of the refrigeration circuit 20 which contains certain standard refrigeration elements. These elements include a compressor 21 having a suction conduit 22 and a discharge conduit 23. In the suction conduit 22 there is a suction pressure regulator 24 which establishes a constant head for the inlet of the compressor 21 thereby preventing overloading of the compressor. In the discharge conduit 23 there is provided a condenser 25 for condensing the compressed refrigerant vapor coming from the compressor 21 and an expansion valve 26 for flashing a portion of pressurized liquid refrigerant into a vapor thereby considerably lowering the temperature and pressure of the remaining unvaporized refrigerant. Preferably the refrigerant is a halogenated hydrocarbon fluid.

The segment 20B comprises that portion of the refrigeration circuit 20 wherein the present invention resides.

To complete the refrigeration circuit 20, an evaporator comprising a totally-enclosed bellows 27 is connected to the discharge conduit 23 and to the suction conduit 22.

Gaseous refrigerant is compressed, condensed to a liquid and then expanded, in the form of a liquid spray into the bellows 27. Heat transferred into the liquid refrigerant causes it to evaporate. The evaporated refrigerant is carried by means of the suction conduit 22 back to the compressor 21.

According to the present invention, the totally-enclosed bellows 27 is extendable and contractable in the direction of its length. A water supply tank 28, positioned directly above the bellows 27, supplies droplets of water to the exterior surface of the bellows 27 in liquid-chilling relation therewith. As the droplets flow around the periphery of the bellows 27, they are prechilled whereby a major portion of the droplets is solidified in the form of crescents (in a manner to be described).

A novel cyclically operated means is provided for periodically extending the bellows 27, in the direction of its length. The cyclically operated means preferably comprises a solenoid operated valve 29 which is connected into the suction conduit 22 to serve as a flow interrupting valve. The valve 29 periodically terminates the exhaustion of the evaporated refrigerant from the interior of the bellows 27 whereby the accumulation of evaporated and unevaporated refrigerant creates a continually increasing pressure. When the increasing pressure reaches a predetermined value, the bellows 27 is extended and the ice formed thereon is automatically disengaged from its exterior surface. The disengaged ice falls into an ice storage means 30 where it is stored until it is needed.

When the valve 29 is opened, the pressure within the bellows 27 falls. A return means (not shown in FIGURE 1) is provided which contracts the bellows 27 into its normally relaxed condition.

It should be evident at this point that the size of the ice crescents formed may be controlled by changing the length of time elapsed between distortions of the bellows 27. The longer the time elapsed between distortions of the bellows, the larger the ice crescents and vice versa.

The accumulated refrigerant vapor, which caused the increased pressure, flows through the suction conduit 22 and enters an accumulator tank 31 wherein the high pressure is absorbed. The accumulator tank 31 is provided to absorb surge of gas which cannot by-pass the suction pressure regulator.

In the present invention, the sensible and latent heat removal capacity of the bellows 27 remains constant. It is general knowledge that the water temperature may vary from a winter low of about 40° F. to a summer high of about 80° F. Hence, the refrigerating capacity of the bellows 27 is set to completely freeze water at a temperature of 60° F. However, when the water temperature is 40° F., ice will form around a major portion of the periphery of the bellows. The ice, thus formed, is difficult to remove. On the other hand, when the water temperature is 80° F., complete freezing cannot occur. In this instance, water is wasted.

In order to overcome this problem, a water level control or regulating means 32 (later to be described) is provided in the water supply tank 28 for controlling the level or head of the water in response to the temperature of the water—the rate of discharge of the water from the tank 28 being controlled by the level of the water. The regulating means 32 controls the discharge of water from a water supply source 33 into the tank 28. When the water is relatively cold, the water level in the tank 28 is raised by increasing the inlet rate from the water supply source 33. Hence, the rate at which droplets are deposited on the bellows 27 is increased. On the other hand, when the water is relatively warm, the water level is lowered by decreasing the inlet rate from the water supply source 33. Thus, the rate at which the droplets are deposited on the bellows 27 is decreased.

Referring now to FIGURE 2, there is illustrated in a cross-sectional view the preferred embodiment of the totally-enclosed bellows 27. As shown, the totally-enclosed bellows 27 generally comprises a cylindrical distortable wall 36, a fixed end wall 37, a moveable end wall 38, a cap member 39 and a housing 40 having a lower body portion 41 and an upper body portion 42.

The cylindrical distortable wall 36 preferably is formed from lightweight stainless steel. The distortable wall 36 is formed with corrugations which define a plurality of troughs 43 whose function will be described later in the specification. At the ends of the distortable wall 36 are secured retaining rings 44a and 44b each having an annular groove 45 adapted to hold a sealing ring 46. In FIGURE 2, the distortable wall 36 is illustrated in its normally collapsed position.

The moveable end wall 38 has a plurality of vapor outlet openings 47 formed in a circular pattern similar to that pattern shown in FIGURE 3.

The cap member 39 is dome-shaped and has a peripheral flange 48 which engages the retaining ring 44a. The moveable end wall 38 is positioned between the retaining ring 44a and the peripheral flange 48 and is clamped therebetween preferably by means of a V-shaped ring 49. The sealing ring 46 engages the face of the peripheral flange 48 and provides a vapor tight seal.

The dome shaped portion of the cap member 39 cooperates with the moveable end wall 38 to form a vapor receiving cavity 50 which receives the vaporized refrigerant issuing from the vapor outlet openings 47.

The fixed end wall 37 has a plurality of liquid inlet openings 51 formed in a circular pattern as shown in FIGURE 3. The spray of liquid refrigerant flows through the liquid inlet openings 51 to the interior of the bellows 27.

The lower body portion of the housing 40 has a generally horizontal refrigerant vapor receiving well 52. A recess 53 is formed in the front face of the lower body portion 41 which cooperates with a first annular hub 54 (of smaller diameter) of the fixed end wall 37 to form an annular well 55. An inlet conduit means comprising a refrigerant passageway 56 extends through the upper surface of the upper body portion 42 to communicate with the annular well 55. The discharge conduit 23 (not shown, see FIGURE 1) is connected with the refrigerant passageway 56 to communicate the spray of liquid refrigerant through the liquid inlet openings 51 to the interior of the bellows 27.

The lower body portion 41 also includes a peripheral flange 57 which engages the face of the retaining ring 44b. The fixed end wall 37 is positioned between the retaining ring 44b and the peripheral flange 57 and is clamped therebetween preferably by means of V-shaped ring 58. The sealing ring 46 engages the face of the peripheral flange 57 and provides a vapor tight seal.

A suction conduit means or vapor passageway 59 extends through the upper surface of the upper body portion 42 to communicate with the horizontal vapor receiving well 52 in the lower body portion 41. The suction conduit 22 (not shown, see FIGURE 1) is connected with the vapor passageway 59 to exhaust the evaporated refrigerant from the interior of the bellows 27.

The housing 40 and the cap member 39 may comprise injection molded structural plastics such as polyamides, polyacetals, etc. Alternatively, the housing 40 and the cap member 39 may comprise die cast aluminum.

In order to transfer the refrigerant vapor from the receiving cavity 50 to the vapor receiving well 52, a vapor conduit 60 is provided. The vapor conduit 60 has a first end 61 extending through an annular hub 62 of the moveable end wall 38 and is rigidly secured therein by any suitable means such as a bolt 63. The vapor conduit 60 extends through the interior of the bellows 27 and is substantially axially aligned with the cylindrical distortable wall 36. A second end 64 of the vapor conduit 60 extends through a second annular hub 65 and the first annular hub 54 of the fixed end wall 37. The second end 64 is slideably engaged with the first and second annular hubs 54, 65 and extends into the refrigerant vapor receiving well 52. Thus, the evaporated refrigerant flows from the interior of the bellows 27, through the vapor outlet openings 47 and into the vapor receiving cavity 50; thence through the vapor conduit 60 into the refrigerant receiving well 52 and through the vapor passageway 59 to be recirculated through the refrigeration circuit 20 (see FIGURE 1).

As heretofore stated, a return means 66 is provided for contracting the bellows 27 into its normally relaxed position as shown in FIGURE 2. The return means 66 comprises a spring means 67 surrounding that portion of the second end 64 of the vapor conduit 60 which is disposed within the refrigerant receiving well 52. A transverse flange 68 is provided on the extreme end of the second end 64. The spring means 67 has one end engaged with the transverse flange 67 and the other end engaged with the first annular hub 54 of the fixed end wall 37. When the distortable wall 36 is extended in the direction of its length, the spring means 67 is compressed and provides a force which will urge the distortable wall 36 into its normally relaxed position.

In order to limit the extension of the distortable wall 36, a stop means is provided which comprises a bolt 69 extending through the lower body portion 41 of the housing 40 and projecting into the refrigerant vapor receiving well 52. When the distortable wall 36 is extended, the transverse flange 68 engages the bolt 69 and thereby limits the longitudinal travel of the distortable wall 36 to a predetermined length.

When, as here-in-before described, the solenoid operated valve 29 (see FIGURE 1) is opened, the high internal pressure of the bellows 27 is released whereupon the spring means 67 rapidly contracts the distortable wall 36. In order to cushion the rapid contraction, a buffer spring 70 is provided which surrounds the vapor conduit 60. Preferably the buffer spring 70 has a spring constant which is greater than the spring constant of the spring means 67. A collar 71 is secured at a predetermined point along the vapor conduit 60 between the fixed end wall 37 and the moveable end wall 38. The buffer spring 70 is positioned between the collar 71 and the fixed end wall 37. When the distortable wall 36 is rapidly contracted, the collar 71 compresses the buffer spring 70 so that the distortable wall 36 is momentarily contracted beyond its normally relaxed position. The momentary contraction of the distortable wall 36, beyond its normally relaxed position serves an important function which will be described later in the specification.

Referring to FIGURES 2 and 4, the upper body portion 42 of the housing 40 comprises a plate-like member 72 which is adapted to be secured in a generally horizontal position. The plate-like member 72 has a hollow portion 73 which extends over the distortable wall 36. The hollow portion 73 serves as a water manifold and has a water inlet conduit 74 which is connected (as schematically illustrated) to the water supply tank 28. A shut-off valve 75 is provided in the water inlet conduit 74. The hollow portion 73 also has a plurality of liquid outlet openings or orifices 76 provided in the bottom wall thereof which serve to deposit water droplets 77 in the troughs 43. Preferably a pair of the orifices 76 is provided for each of the troughs 43 as shown in FIGURE 4. The orifices 76 are preferably comprised of replaceable nylon orifices which are threaded into apertures in the bottom wall of the hollow portion 73. The nylon orifices 76, being slightly compressible will form a good seal. Furthermore, nylon has no ionic attraction for salts that would otherwise collect and clog the orifices.

Referring now to FIGURES 5 and 6, the water droplets 77, issuing from the orifices 76, enter the troughs 43. As the water droplets 77 flow around the periphery of the distortable wall 36, as best shown in FIGURE 6, they are prechilled in the area of the troughs 43 indicated by the included angle A. When the water droplets 77 reach the area of the troughs 43 indicated by the included angle B, they are solidified to form an ice crescent 78.

FIGURE 7 shows the distortable wall 36 after it has been extended in the direction of its length. The ice crescent 78, formed in the trough 43, is shown disengaged from the distortable wall 36. The disengagement of the ice 78 is automatic due to a slight flexure of the walls 36 in addition to expanding of the grooves 43. Furthermore, as the pressure rises within the bellows, the temperature will rise slightly to aid in releasing the ice crescents.

When the high internal pressure of the bellows 27 is released, the spring means 67 rapidly contracts the distortable wall 36 whereupon the buffer spring 70 is compressed. Upon compression of the buffer spring 70, the distortable wall 36 is momentarily contracted beyond its normally relaxed position. This extra contraction causes the walls of the troughs 43 to be further flexed by moving towards each other. The extra flexing that the walls undergo insures that any of the ice crescent 78 which is still clinging to the distortable wall 36 will be disengaged therefrom.

In FIGURE 8 there is illustrated a typical configuration of the ice crescent 78 which is formed in the troughs 43.

In FIGURE 5, two sizes of ice crescents 78' and 78" are illustrated. When the time elapsed between distortions of the bellows 27 is relatively long, the large ice crescent 78' is formed. And when the time elapsed between distortions of the bellows 27 is relatively short, the small ice crescent 78" is formed.

The regulating means 52, whose function was described earlier in the specification, will now be described with reference to FIGURES 9 and 10.

In FIGURE 9, the water supply tank 28 is shown having the water inlet conduit 74, which leads to the hollow portion 73 of the housing 40. The shut-off valve 75 is also shown. Within the water supply tank 28 there is positioned the regulating means 32 now to be described.

Referring to FIGURES 9 and 10, the regulating means 32 comprises a float 79 which is buoyantly supported by the water whose level is indicated at H. The float has a float arm 80 extending therefrom which is pivotally secured at its extreme end 81 to a wall 82 of the tank 28 at a point above the level of the water.

The regulating means 32 also has a resilient plug means comprising a sealed bellows 83 which has a temperature sensitive gas charge therein. A link 84 is pivotally connected at one end to the bellows 83 and at its other end to the float arm 80.

The bellows 83 has a needle valve stem 85 which is maintained in flow controlling relation with an inlet aperture 86 of a nozzle 87. The nozzle 87 is connected to the water supply conduit 33 so that the water is communicated to the inlet aperture 86. A housing 88 is secured to the nozzle 87 and extends downwardly to surround the bellows 83 whereby the incoming water washes over the bellows 83 in heat transferring relation therewith.

It should be noted that the bellows 83 is extendable and contractable under the influence of the pressure produced by the gas sealed therein. When the gas temperature increases, the pressure increases whereupon the bellows 83 extends. And when the gas temperature decreases, the pressure decreases whereupon the bellows 83 contracts. Hence, the length of the bellows 83 is proportional to the temperature of the incoming stream of water.

Referring back to FIGURE 9, the rate of discharge of the water through the water inlet conduit 74 is dependent on the level or head of water, indicated at H, in the tank 28. Thus when the water is relatively cold, the rate at which the water droplets are deposited on the distortable wall 36, must be increased. This is accomplished by the bellows 83 since it will contract so that the incoming water flow rate from the water supply conduit 33 is increased. The level of the water will rise to a new position indicated by the float 79′ shown in phanto moutline. The higher water level will increase the flow rate through the water inlet conduit 74 and hence the rate at which the water droplets 77 are deposited on the distortable wall 36.

Alternatively, when the water is relatively warm, the rate at which the water droplets 77 are deposited on the distortable wall 36 must be decreased. This is also accomplished by the bellows 83 since it will extend so that the incoming water rate from the water supply conduit 33 is reduced. The level of the water will fall to a new position indicated by the float 79″ shown in phantom outline. The lower water level will decrease the flow rate through the water inlet conduit 74 and hence the rate at which the water droplets 77 are deposited on the distortable wall 36.

It should be evident that more than one of the totally-enclosed bellows 27 may be staged together, one beside the other, so that the ice making capacity of the plurality of units will be large.

What I claim is:

1. A liquid solidifying apparatus comprising in combination:
   a normally relaxed totally-enclosed bellows comprising
      a substantially vertical fixed end wall having a plurality of refrigerant inlet openings formed therein,
      a cylindrical, distortable wall extending horizontally from said fixed end wall, said distortable wall being corrugated, the corrugations thereof defining a plurality of troughs,
      a moveable end wall having a plurality of vapor outlet openings formed therein, and
      a cap member secured to said moveable end wall, said cap member and said moveable end wall cooperating to form a vapor receiving cavity;
   a housing comprising
      a lower body portion secured to said fixed end wall, said lower body portion having a generally horizontal refrigerant vapor receiving well formed therein which is axially aligned with said cylindrical distortable wall,
      an upper body portion comprising a plate-like member adapted to be secured in a generally horizontal position;
   inlet conduit means in said housing communicating with the interior of said bellows through said inlet openings for uninterruptedly introducing a spray of liquid refrigerant;
   vapor conduit means disposed internally of said bellows and having a first end rigidly secured to and fluidly communicating through said moveable end wall with said refrigerant vapor receiving cavity and having a second end slidably engaging and fluidly communicating through said fixed end wall with said refrigerant vapor receiving well;
   suction conduit means in said housing communicating with the interior of said horizontal refrigerant vapor well for exhausting evaporated refrigerant therefrom;
   means for depositing droplets of the liquid to be solidified on the exterior surface of said distortable wall in liquid-chilling relation therewith;
   cyclically operated means for periodically extending the said distortable wall in the direction of its length whereby the solidified deposits formed thereon is automatically disengaged from the said exterior surface of said distortable wall; and
   return means for contracting the said distortable wall into its normally relaxed condition, said return means comprising a transverse flange on the extreme end of said second end, and spring means surrounding said second end and positioned between said transverse flange and said fixed end wall.

2. The liquid solidifying apparatus of claim 1 including:
   a collar secured at a predetermined point along the said vapor conduit means between the said fixed end wall and said moveable end wall; and
   a buffer spring surrounding the vapor conduit means and positioned between the said collar and the said fixed end wall, said buffer spring having a spring constant which is greater than the spring constant of said spring means.

3. Liquid solidifying apparatus comprising, in combination:
   a totally enclosed bellows having a horizontally-elongated, axially distortable wall;
   refrigeration means including conduit means for uninterruptedly introducing a spray of liquid refrigerant into said bellows and for exhausting evaporated refrigerant from said bellows;
   means for depositing droplets of a liquid to be solidified on the exterior of said bellows along its length, said liquid depositing means comprising a liquid reservoir positioned above said bellows and having orifice means therein for gravity release of liquid therefrom onto said bellows;
   means for regulating the liquid level within said reservoir to control the gravity flow of liquid therefrom, means responsive to the temperature of said liquid for controlling the level of said liquid as an inverse function of said temperature and thereby varying the rate of discharge of said liquid as an inverse function of said temperature;
   and means for periodically expanding and contracting said distortable wall in the direction of its length whereby solidified deposits formed thereon are automatically disengaged therefrom.

4. Liquid solidifying apparatus as defined in claim 3 wherein said temperature responsive liquid level control means comprises:
   a float buoyantly supported by said liquid including a float arm extending therefrom, said float arm being pivotally secured at its end to the wall of said vessel at a point above the level of said liquid;
   conduit means for supplying the said liquid into the said vessel; and
   a resilient plug means having one end pivotally connected to the said float arm intermediate of its end and the other end maintained in flow controlling relation with the said conduit means, the length of said resilient plug means being proportional to the temperature of the incoming stream of said liquid.

5. Liquid solidifying apparatus comprising, in combination:
   a totally enclosed bellows having a distortable wall exposed to the atmosphere;
   inlet conduit means communicating with the interior of said bellows for uninterruptedly introducing a spray of liquid refrigerant;
   suction conduit means communicating with the interior of said bellows for exhausting evaporated refrigerant;
   valve means in said suction conduit means for periodically terminating the exhaustion of the evaporated refrigerant whereby the accumulation of evaporated refrigerant within said bellows creates an increasing pressure therein, said increasing pressure causing said distortable wall to be extended in the direction of its length; an accumulator tank in said suction conduit means downstream of said valve means;
   means for depositing droplets of the liquid to be solidified on the exterior surface of said distortable wall in liquid-chilling relation therewith;
   and return means for contracting said distortable wall into its normally relaxed condition.

6. Liquid solidifying apparatus, comprising, in combination:
   a normally relaxed bellows comprising, a substantially fixed end wall; a generally cylindrical distortable wall extending horizontally from said fixed end wall, said distortable wall being corrugated, the corrugations thereof defining a plurality of troughs; and a movable end wall contiguous with the free end of said cylindrical distortable wall;
   inlet conduit means communicating with the interior of said bellows for uninterruptedly introducing a spray of liquid refrigerant;
   suction conduit means communicating with the interior of said bellows for exhausting evaporated refrigerant;
   means for depositing droplets of the liquid to be solidified on the exterior surface of said distortable wall in liquid chilling relation therewith;
   cyclically operated means for periodically extending said distortable wall in the direction of its length whereby the solidified deposit formed thereon is automatically disengaged from its exterior surface of said distortable wall;
   and return means for contracting said distortable wall into its normally relaxed condition, said return means comprising: at least one rod means having a first end rigidly secured to said movable end wall of said bellows and having a second end slidably extending through a portion of said fixed end wall of said bellows, said second end of said rod means having a transverse flange contiguous therewith; and spring means surrounding said second end of said rod means between said transverse flange and said fixed end walls, the longitudinal axis of said rod means and said spring means being substantially parallel with the longitudinal axis of said distortable wall whereby, when said distortable wall is extended in the direction of its length, said spring means is compressed.

7. The liquid solidifying apparatus of claim 6 including:
   a collar secured at a predetermined point along the said rod means between the said movable and fixed end walls;
   a buffer spring surrounding the said rod means and positioned between the said collar and the said fixed end wall, said buffer spring having a spring constant which is greater than the spring constant of said spring means;
   said buffer spring being so positioned whereby when the said spring means suddenly contracts the said distortable wall, the said collar compresses the said buffer spring and the distortable wall is momentarily contracted beyond its normally relaxed position to thereby insure the complete removal of the solidified deposits formed thereon.

8. A regulating means for controlling the rate of discharge of a liquid from a vessel to a congealing surface by controlling the level of said liquid in said vessel in response to its temperature, said regulating means comprising:
   a float buoyantly supported by said liquid including a float arm extending therefrom, said float arm being pivotally secured at its end to the wall of said vessel at a point above the level of said liquid;
   conduit means for supplying the said liquid into the said vessel;
   a resilient plug means having valve means mounted at one end thereof cooperating with said conduit means for controlling the flow of liquid therethrough, the other end of said resilient plug means being pivotally connected to said float arm at an intermediate portion thereof, and positioned in the path of liquid from said conduit means whereby the length of said resilient plug means is proportional to the temperature of said liquid; and
   liquid outlet means in flow communication with said vessel for discharging liquid therein onto a congealing surface.

9. The regulating means of claim 8 wherein the said resilient plug means comprises a sealed bellows having a temperature sensitive gas charge therein.

10. The regulating means of claim 9 including a vertically disposed housing having an inlet opening in one end communicating with the said conduit means and an outlet opening in the other end, said housing surrounding the said sealed bellows whereby the incoming liquid washes over the said bellows in heat transferring relation therewith.

11. Liquid solidifying apparatus comprising, in combination:
   a totally enclosed bellows having a horizontally-elongated, axially distortable wall that is corrugated in longitudinal cross section to form a plurality of peripherially extending troughs;
   refrigeration means including conduit means for uninterruptedly introducing a spray of liquid refrigerant into said bellows and for exhausting evaporated refrigerant from said bellows;
   means for depositing droplets of a liquid to be solidified on the exterior of said bellows along its length, said liquid depositing means comprising a liquid reservoir positioned above said bellows and having orifice means therein for gravity release of liquid therefrom onto said bellows, said orifice means comprising a pair of liquid outlet openings in fluid communication with said reservoir, said outlet openings being aligned with opposed sides of one of said troughs whereby pairs of droplets discharged therefrom are deposited on either side of the uppermost portion of one of said troughs, said droplets being pre-chilled as they flow around the periphery thereof whereby a major portion of the droplets is solidified in the form of a crescent along the lowermost portion of said trough;
   means for regulating the liquid level within said reservoir to control the gravity flow of liquid therefrom; and
   means for periodically expanding and contracting said distortable wall in the direction of its length whereby solidified deposits formed thereon are automatically disengaged therefrom.

References Cited by the Examiner

UNITED STATES PATENTS

| | | | |
|---|---|---|---|
| 2,613,511 | 10/1952 | Walsh | 62—74 X |
| 3,152,453 | 10/1964 | Hamilton | 62—74 X |
| 3,255,606 | 6/1966 | Hammer | 62—353 |

ROBERT A. O'LEARY, *Primary Examiner.*

W. E. WAYNER, *Assistant Examiner.*